US012565300B2

(12) United States Patent
Iyengar

(10) Patent No.: US 12,565,300 B2
(45) Date of Patent: Mar. 3, 2026

(54) LOAD-BEARING STRUCTURES

(71) Applicant: AIRBUS OPERATIONS LIMITED,
Bristol (GB)

(72) Inventor: Parthasarathy Iyengar, Bristol (GB)

(73) Assignee: AIRBUS OPERATIONS LIMITED,
Bristol (GB)

( * ) Notice: Subject to any disclaimer, the term of this
patent is extended or adjusted under 35
U.S.C. 154(b) by 230 days.

(21) Appl. No.: 18/553,019

(22) PCT Filed: Mar. 24, 2022

(86) PCT No.: PCT/EP2022/057730
§ 371 (c)(1),
(2) Date: Sep. 28, 2023

(87) PCT Pub. No.: WO2022/207437
PCT Pub. Date: Oct. 6, 2022

(65) Prior Publication Data
US 2024/0190552 A1 Jun. 13, 2024

(30) Foreign Application Priority Data

Mar. 31, 2021 (GB) ..................................... 2104625

(51) Int. Cl.
*B64C 1/06* (2006.01)
*B64C 1/00* (2006.01)
*B64U 20/65* (2023.01)
(52) U.S. Cl.
CPC ................. *B64C 1/06* (2013.01); *B64C 1/00*
(2013.01); *B64U 20/65* (2023.01);
(Continued)

(58) Field of Classification Search
None
See application file for complete search history.

(56) References Cited

U.S. PATENT DOCUMENTS

| | | | |
|---|---|---|---|
| 3,946,127 A | 3/1976 | Eisenmann et al. | |
| 2010/0086804 A1* | 4/2010 | Popp ......................... | B32B 3/06 |
| | | | 428/614 |

(Continued)

OTHER PUBLICATIONS

Tanaka et al., "Effect of fiber orientation on fatigue crack propagation in short-fiber reinforced plastics", Engineering Fracture Mechanics, Apr. 5, 2014, pp. 44-58, vol. 123.
(Continued)

*Primary Examiner* — Xiaobei Wang
(74) *Attorney, Agent, or Firm* — Nixon & Vanderhye, PC

(57) ABSTRACT
A load-bearing structure is disclosed and configured to, during operation of the structure, transfer load from a first part of the structure to a second part of the structure via a load path. The component includes a matrix material, a plurality of longitudinal first reinforcing elements embedded in the matrix material, and a plurality of longitudinal second reinforcing elements embedded in the matrix material. The long axis of each first reinforcing element is substantially aligned with a first direction and the long axis of each second reinforcing element is substantially aligned with a second direction, the second direction being substantially perpendicular to the first direction. The structure has a predefined crack-propagation region configured to control the propagation of a crack in the structure. The crack-propagation region either comprises multiple first reinforcing elements and does not comprise any second reinforcing elements; or comprises multiple second reinforcing elements and does not comprise any first reinforcing elements.

18 Claims, 5 Drawing Sheets

(52) U.S. Cl.
CPC ................. *B64C 2001/0072* (2013.01); *Y10T*
*428/12431* (2015.01); *Y10T 428/12438*
(2015.01); *Y10T 428/12444* (2015.01)

(56) References Cited

U.S. PATENT DOCUMENTS

| | | | | |
|---|---|---|---|---|
| 2011/0045232 | A1* | 2/2011 | Kismarton | .......... B29C 66/1122 |
| | | | | 428/113 |
| 2013/0280516 | A1* | 10/2013 | Kozar | .................... B29C 70/16 |
| | | | | 428/297.4 |
| 2021/0276253 | A1* | 9/2021 | Erb | ....................... B29C 64/188 |
| 2024/0124661 | A1* | 4/2024 | D'Agostino | .............. C08J 5/06 |

OTHER PUBLICATIONS

International Search Report and Written Opinion of the ISA for
PCT/EP2022/057730 mailed Jul. 11, 2022, 11 pages.

* cited by examiner

30

1

LOAD-BEARING STRUCTURES

CROSS REFERENCE TO RELATED APPLICATIONS

The present application is a National Phase of International Application Number PCT/EP2022/057730 filed Mar. 24, 2022, which designated the U.S. and claims priority benefits from United Kingdom Application GB 2104625.5, filed Mar. 31, 2021, the entire contents of each of which are hereby incorporated by reference.

TECHNICAL FIELD

The present invention relates to load-bearing structures comprised of continuous fibre Metal Matrix Composite (MMC) materials, such structures being configured to, during operation, transfer load from a first part of the structure to a second part of the structure via a load path. The present invention also relates to aircraft comprising such structures.

BACKGROUND

Metal matrix composites (MMCs) are composite materials comprising elements of a first material (in the form of fibres or particles) distributed within a matrix of a second, metallic material. The physical properties of the MMC are a function of the interaction between the first material and the second (matrix) material. MMCs in which the first material is in the form of continuous fibres are known as "continuous fibre MMCs".

Aircraft components, particularly components for commercial airliners, are preferably as lightweight as possible, whilst also being low cost and easy to manufacture. However; many aircraft components must withstand extreme environments during operation, and must be very reliable. Moreover, the failure modes of aircraft components must be predictable and well-understood. Continuous fibre MMCs offer the promise of lighter, easier to manufacture load-bearing components, but the reliability and failure modes of MMC materials are not sufficiently well-understood for use in commercial aircraft structures. The present invention seeks to address this. In particular, it seeks to provide design concepts which enable the failure mode and time of failure of a continuous fibre MMC structure to be planned.

SUMMARY

A first aspect of the present invention provides a load-bearing structure configured to, during operation of the structure, transfer load from a first part of the structure to a second part of the structure via a load path. The component comprises a matrix material, a plurality of longitudinal first reinforcing elements embedded in the matrix material, and a plurality of longitudinal second reinforcing elements embedded in the matrix material. The long axis of each first reinforcing element is substantially aligned with a first direction and the long axis of each second reinforcing element is substantially aligned with a second direction, the second direction being substantially perpendicular to the first direction. The structure has a predefined crack-propagation region configured to control the propagation of a crack in the structure. The crack-propagation region either comprises multiple first reinforcing elements and does not comprise any second reinforcing elements; or comprises multiple second reinforcing elements and does not comprise any first reinforcing elements.

Optionally, the load-bearing structure further comprises a plurality of longitudinal third reinforcing elements embedded in the matrix material, wherein the long axis of each third reinforcing element is substantially aligned with a third direction, the third direction being substantially perpendicular to the first direction and substantially perpendicular to the second direction.

Optionally, the load path is substantially within a plane defined by the first direction and the second direction.

Optionally, the load path is substantially parallel to the first direction, and the crack-propagation region comprises multiple first reinforcing elements and does not comprise any second reinforcing elements.

Optionally, a length of each first reinforcing element is at least 50% of a dimension of the structure along the first direction and a length of each second reinforcing element is at least 50% of a dimension of the structure along the second direction.

Optionally, the crack-propagation region is longitudinal and has a long axis parallel to the first direction.

Optionally, the location of the crack-propagation region is selected such that the presence of cracks in the crack-propagation region does not prevent operation of the structure to transfer load from the first part to the second part.

Optionally, the load-bearing structure further comprises a predefined crack-termination region of the structure which does not contain any reinforcing elements, wherein the crack-termination region is adjacent to the crack-propagation region and is configured to limit the propagation of a crack in the structure.

Optionally, a region of the load-bearing structure disposed between the crack-termination region and a surface of the structure is transparent.

Optionally, the load-bearing structure further comprises an opening which extends through the structure, the structure is configured to transfer load from the opening to the second part of the structure via the load path, and the crack-propagation region is adjacent the opening.

Optionally, the opening is configured to engage with a further structure during operation of the structure such that load is transferred from the further structure to the structure via the opening.

Optionally, the crack-propagation region is an internal region of the load-bearing structure, such that the crack-propagation region does not comprise any part of any surface of the load-bearing structure.

Optionally, the crack-propagation region comprises a part of at least one surface of the load-bearing structure.

Optionally, a transparent layer is provided on a part of a surface of the load-bearing structure which is comprised in the crack-propagation region.

Optionally, each first reinforcing element and each second reinforcing element comprises a continuous element.

Optionally, the matrix material is aluminium.

Optionally, each first reinforcing element and each second reinforcing element comprises one of: an aluminium oxide fibre, a carbon fibre; a silicon carbide fibre.

Optionally, the load-bearing structure is an aircraft structure.

An aircraft comprising a load-bearing structure according to the first aspect.

BRIEF DESCRIPTION OF THE DRAWINGS

Embodiments of the invention will now be described, by way of example only, with reference to the accompanying drawings, in which.

DETAILED DESCRIPTION

The examples described herein relate to load-bearing structures. Each example load-bearing structure is configured to, during operation of the structure, transfer load from a first part of the structure to a second part of the structure via a load path. Each example structure comprises a matrix material, a plurality of longitudinal first reinforcing elements embedded in the matrix material, and a plurality of longitudinal second reinforcing elements embedded in the matrix material. The long axis of each first reinforcing element is substantially aligned with a first direction and the long axis of each second reinforcing element is substantially aligned with a second direction which is substantially perpendicular to the first direction. Each example structure has a predefined crack-propagation region configured to control the propagation of a crack in the structure. The predefined crack-propagation region comprises multiple first reinforcing elements and does not comprise any second reinforcing elements.

By virtue of the load-bearing structure having first longitudinal reinforcing elements and substantially perpendicular second longitudinal reinforcing elements (that is, the load-bearing structure is multi-directionally reinforced), the load-bearing structure has a high resistance to the propagation of material damage to the structure in regions of the structure where both first and second longitudinal reinforcing elements are present. However, all load-bearing structures will eventually experience fatigue failures after having been subjected to enough load cycles. It is expected that the manner of failure of a multi-directionally reinforced load-bearing structure will be difficult to predict. In certain applications, such as aircraft structures, being able to predict with a high degree of certainty the manner in which a load-bearing structure will fail is very important.

Advantageously, the load-bearing structures according to the invention are configured to fail in a controlled and predictable manner, as well as being bi-directionally reinforced. This is achieved by providing a pre-defined crack propagation region within each structure. The crack-propagation region is uni-directionally reinforced, and thereby guides the propagation of a crack within the region along a direction parallel to the reinforcing elements present in the crack-propagation region. The location and orientation of the crack-propagation region may be selected such that cracks in this region do not prevent the structure from performing its load transmitting function. The manner in which the load-bearing structures according to the invention achieve these advantages will now be explained in more detail with reference to the accompanying figures.

Figure 1A:
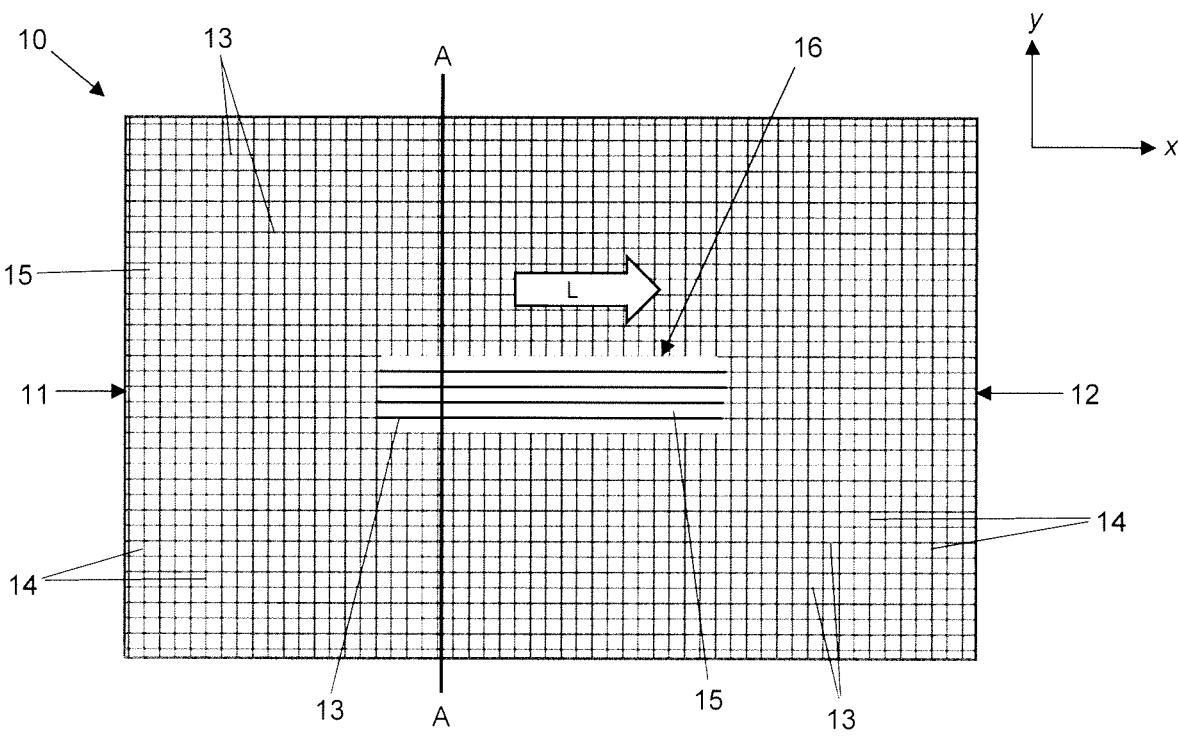
FIG. 1*a* is a schematic plan view of a first example load-bearing structure according to the invention.
Figure 1B:
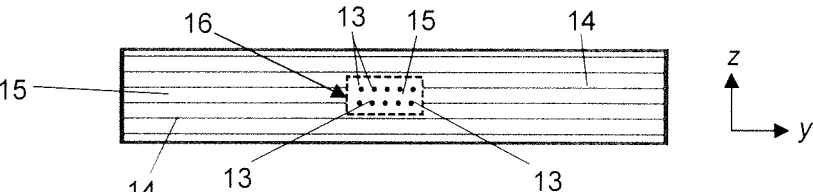
FIG. 1*b* is a cross-section through the example load-bearing structure of FIG. 1*a;*
Figure 1C:
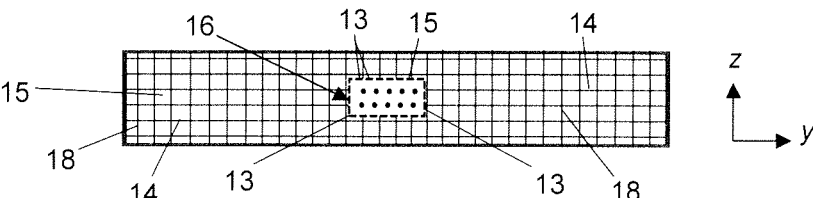
FIG. 1*c* is a cross-section through an alternative version of the example load-bearing structure of FIG. 1*a;*

FIG. 1*a* is a plan view of an example load-bearing structure 10 according to the invention. FIGS. 1*b* and 1*c* are each cross-sections through the structure 10 along the line A-A. The load-bearing structure 10 may be configured to be comprised in a vehicle, or any other mechanical system or larger structure. In some examples the structure 10 is an aircraft structure, meaning that it is configured to be comprised in an aircraft.

The structure 10 is configured to, during operation of the structure 10, transfer load L (indicated by a block arrow in the figures) from a first part 11 of the structure 10 to a second part 12 of the structure 10 via a load path. "Operation" of the structure 10 means that the structure 10 is receiving a load (e.g. from a further component or structure engaged with the first part 11) of a type that the structure 10 is designed to transfer. Where the structure 10 is designed to be connected to one or more further components or structures in order to perform its function, operation of the structure 10 should be understood to mean that such connections are present. Operation of the structure 10 may (but need not) mean operation of a vehicle or other mechanical system or structure in which the structure 10 is comprised.

The first part 11 of the structure, at which the load L is received, may be located at the location of a connection between the structure 10 and a further component or structure. Such a location may be, for example, at an edge of the structure 10 and/or may be the location of a connection feature such as a lug, a fastener hole, bracket, a spigot or the like. Such a location may be on a surface of the structure 10. The second part 12 of the structure, to which the load L is transferred, may similarly be the location of a connection between the structure 10 and a further component or structure (which may or may not be the same further component or structure to which the first part 11 is connected). In the illustrated example, the structure 10 is configured to transfer the load L from the left-hand end (with reference to the orientation shown in FIG. 1*a*) of the structure 10 to the right-hand end of the structure 10.

The structure 10 is formed from a metal matrix composite (MMC). The composite comprises a plurality of longitudinal first reinforcing elements 13 embedded within a metal matrix 15, and a plurality of longitudinal second reinforcing elements 14 also embedded within the metal matrix 15. The matrix material 15 may be aluminium, titanium, or any other metallic material. Preferably the matrix material is relatively lightweight, low cost, and easy to machine.

A "longitudinal" element is considered to be any structure having one dimension that is significantly longer than any other dimension. For example wires, fibres, tapes, threads and the like are all considered to be longitudinal elements. The long axis of each first reinforcing element is substantially aligned with a first direction x, and the long axis of each second reinforcing element is substantially aligned with a second direction y. The first direction x and the second direction y are substantially perpendicular to each other.

The structure 10 has a predefined crack-propagation region 16, which is configured to control the propagation of a crack in the structure. The crack-propagation region 16 comprises multiple first reinforcing elements 13 and does not comprise any second reinforcing elements 14. Thus, the structure 10 is bi-directionally reinforced in regions other than the crack-propagation region 16, and is uni-directionally reinforced in the crack-propagation region 16. The crack-propagation region 16 is longitudinal and has a long axis parallel to the first direction x.

The location of the crack-propagation region 16 relative to the rest of the structure 10 is selected such that the presence of one or more cracks in the crack-propagation region 16 does not prevent operation of the structure 10 to transfer load from the first part 11 to the second part 12. For example, the location of the crack-propagation region 16 may be selected such that the main load path through the structure does not pass through the crack-propagation region. Furthermore, the crack-propagation region comprises first reinforcing elements 14 which are aligned with the load path, meaning that any cracks in the matrix material 15 in the crack-propagation region 16 should not significantly reduce the ability of the crack-propagation region to transfer the load L.

As can be seen from FIG. 1*b*, in the particular illustrated example the crack-propagation region does not extend for the full thickness (in the direction z) of the structure 10, but instead is present only in a central part. Accordingly, the crack-propagation region 16 is an internal region of the structure 10 such that the crack-propagation region 16 does not comprise any part of any surface of the structure 10. In other examples the crack-propagation region 16 may comprise a part of at least one surface of the load-bearing structure 10, and/or may extend for the full thickness of the structure 10. The extension in the z direction of the crack-propagation region 16 and/or its location along the z direction (i.e. top, middle, bottom relative to the structure 10) may be selected according to the requirements of the particular intended application of the structure 10. For example, the arrangement shown in FIG. 1*b* may be particularly suitable when it is desired to minimise the effect of the crack-propagation region 16 on the strength of the structure 10. Alternatively, an arrangement in which the crack-propagation region 16 comprises a part of at least one surface of the structure 10 may be suitable if it is desired for any cracks in the crack-propagation region to be visible from an external surface of the structure 10.

The manner in which the crack-propagation region 16 operates to control the propagation of a crack in the structure will be described in more detail below with reference to FIG. 5.

Each of the first and second reinforcing elements 13, 14 may be a continuous element, meaning that it comprises a single element which extends across a significant portion of the structure 10. Each first reinforcing element 13 may have a length which is at least 50% of a dimension of the structure 10 along the first direction x. Each second reinforcing elements 14 may have a length which is at least 50% of a dimension of the structure 10 along the second direction y. In the illustrated example, the length of each first reinforcing element 13 is substantially equal to a dimension of the structure 10 in the first direction x and the length of each second reinforcing element 14 which is not interrupted by the crack-propagation region 16 is substantially equal to a dimension of the structure in the second direction y, although this need not be the case in other examples. The first and second reinforcing elements 13, 14 are substantially straight when embedded in the matrix material 15. Other examples are possible in which the first reinforcing elements 13 are curved when embedded in the matrix material, and/or the second reinforcing elements 14 are curved when embedded in the matrix material. The first and second reinforcing elements 13, 14 may comprise a flexible material (although it will be appreciated that flexing of the reinforcing elements 13, 14 is substantially or entirely prevented when the reinforcing elements 13, 14 are embedded in the matrix material 15).

In the illustrated example, each first reinforcing element 13 and each second reinforcing element 14 comprises a fibre. The first and second reinforcing elements 13, 14 may, for example, comprise aluminium oxide fibres, silicon carbide fibres, galvanic-coated carbon fibres, or any other high strength fibres. The material composition and properties of the second reinforcing elements 14 may be (but need not be) substantially identical to the material composition and properties of the first reinforcing elements 13.

In the illustrated example, the first reinforcing elements 13 are evenly distributed throughout the volume of the structure 10. The second reinforcing elements 14 are similarly evenly distributed, except for in the crack-propagation region 16 where the second reinforcing elements 14 are not present at all. In other examples the distribution of the first reinforcing elements 13 may not be even, and/or the distribution of the second reinforcing elements 14 may not be even. For example, the density of first reinforcing elements 13 (that is, the number of first reinforcing elements 13 per unit area in the x-y plane) may be higher in regions of the structure 10 which are expected to experience higher loading during operation of the structure 10.

Each of the first reinforcing elements 13 and each of the second reinforcing elements 14 may be under tension. The first and second reinforcing elements 13, 14 being under tension may be advantageous for manufacturing the structure, as it can facilitate maintaining a desired arrangement of the fibres of the first and second reinforcing elements during the manufacturing process. Additionally, tension in the first and/or second reinforcing elements 13, 14 provides an internal compressive pre-load in the structure 10, which enhances the ability of the structure 10 to resist crack initiation.

In some examples the structure 10 may additionally comprise a plurality of longitudinal third reinforcing elements 18. FIG. 1*c* shows such an example of the structure 10. The long axis of each third reinforcing element 18 is substantially aligned with a third direction z, which is substantially perpendicular to both the first direction x and the second direction y. The third reinforcing elements 18 are not present in the crack-propagation region 16. Apart from their direction, the third reinforcing elements 18 have substantially the same features as the first and second reinforcing elements 13, 14.

Other examples (not illustrated) are possible in which the structure 10 comprises a plurality of reinforcing elements which are substantially aligned with the first direction x and a plurality of reinforcing elements which are substantially aligned with the third direction z, but no reinforcing elements which are substantially aligned with the second direction y; or in which the which the structure 10 comprises a plurality of reinforcing elements which are substantially aligned with the second direction y and a plurality of reinforcing elements which are substantially aligned with the third direction z, but no reinforcing elements which are substantially aligned with the first direction x. It should be appreciated that the first and second reinforcing elements referred to in the claims need not be the first reinforcing elements 13 and the second reinforcing elements 14, but instead may be the first reinforcing elements 13 and the third reinforcing elements 18, or the second reinforcing elements 14 and the third reinforcing elements 18.

Figure 2A:
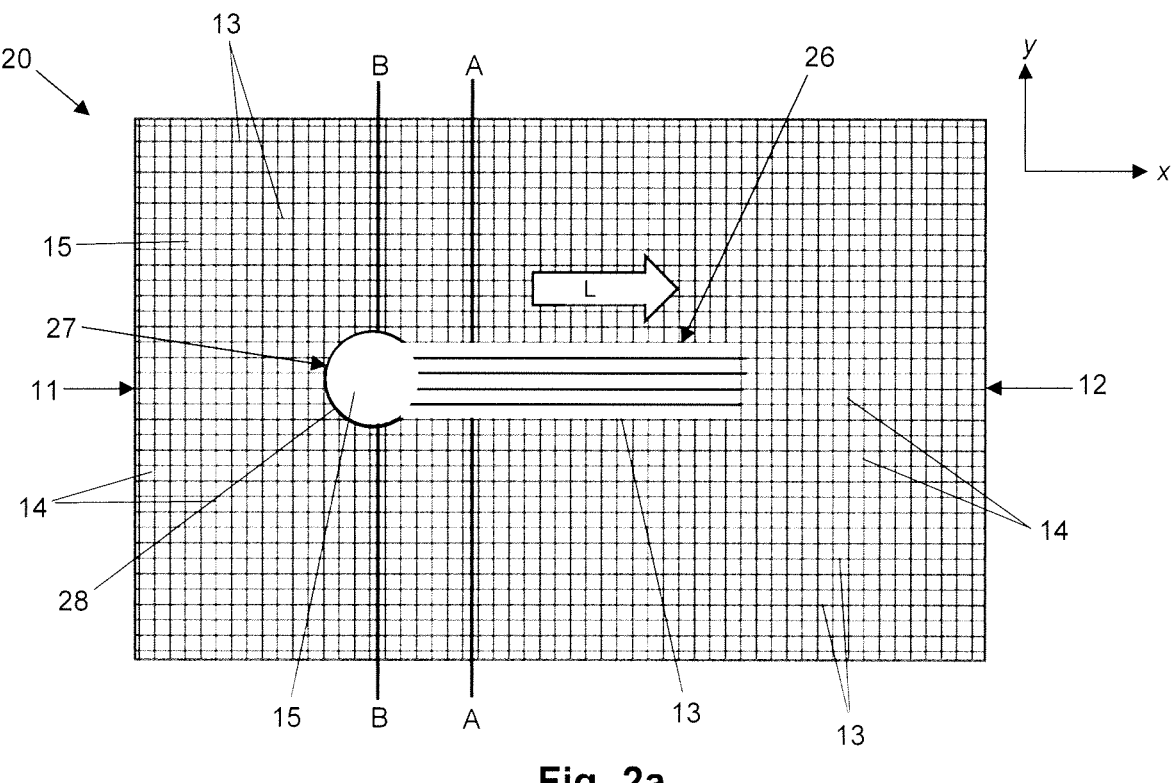
FIG. 2*a* is a schematic plan view of a second example load-bearing structure according to the invention.
Figure 2B:
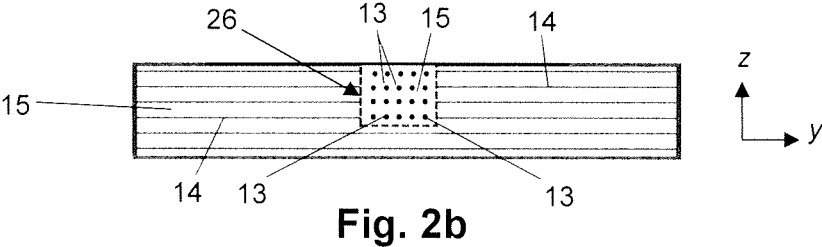
FIG. 2*b* is a first cross-section through the example load-bearing structure of FIG. 2*a;*
Figure 2C:
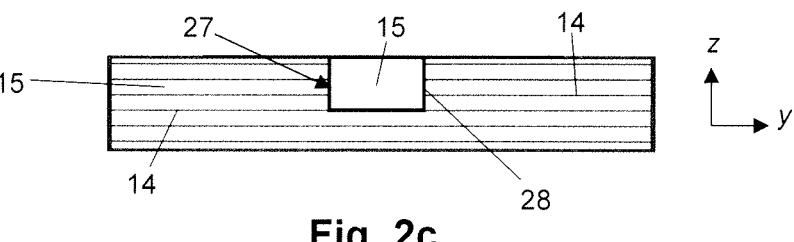
FIG. 2*c* is a second cross-section through the example load-bearing structure of FIG. 2*a;*

FIGS. 2a-c show a second example load-bearing structure 20 according to the invention. FIG. 2a is a plan view of the structure 20, FIG. 2b is a cross-section taken along the line A-A which extends through a crack-propagation region of the structure 20; and FIG. 2c is a cross-section taken along the line B-B which extends through a crack-termination region of the structure 20. Many features of the example structure 20 are substantially identical to the corresponding features of the example structure 10 of FIGS. 1a-c. These features have been given the same reference numbers and will not be further discussed.

The key difference between the example load-bearing structure 20 of FIGS. 2a-c and the example load-bearing structure 10 of FIGS. 1a-c is that the structure 20 additionally comprises a predefined crack-termination region 27. The crack-termination region 27 does not contain any second reinforcing elements 14 and also does not contain any first reinforcing elements 13. In some examples no reinforcing elements of any type or orientation are present in the crack termination region 27. In such examples the crack-termination region 27 may comprise only the matrix material 15.

The example structure 20 comprises a crack-propagation region 26, which is substantially the same as the crack-propagation region 16 of the example structure 10 except that it has a greater thickness (along the z-direction), and it comprises part of the upper surface (with reference to the orientation shown in FIG. 2b) of the structure 20, as can be seen from FIG. 2b. The crack-propagation region 26 is therefore located adjacent the upper surface of the structure 20. The crack-propagation region 26 extends in the z-direction for only part of the thickness in the z-direction of the structure 20, so unlike the crack-propagation region 16, the crack-propagation region 26 is not centrally-located in the structure along the z-direction. In other examples the crack-propagation region 26 may be centrally-located in the structure 20 along the z-direction, or may be disposed toward the lower surface of the structure 20, or may be adjacent the lower surface of the structure 20.

The crack-termination region 27 is adjacent to the crack-propagation region 26. In the illustrated example, the crack-termination region 27 is adjacent an end of the crack-propagation region 26. That is, the crack-termination region 27 and the crack-propagation region 26 are immediately next to each other along the first direction x. The first reinforcing elements 13 which are present in the crack-propagation region 26 terminate at the boundary between the crack-propagation region 26 and the crack termination region 27. The location of the crack-termination region 27 relative to the rest of the structure 20 is selected such that the presence of one or more cracks in the crack-termination region 27 does not prevent operation of the structure 20 to transfer load from the first part 11 to the second part 12. For example, the location of the crack-termination region 27 may be selected such that the main load path through the structure 20 does not pass through the crack-termination region 27.

Similarly to the crack-propagation region 26, the crack-termination region 27 comprises part of the upper surface (with reference to the orientation shown in FIG. 2b) of the structure 20 and is therefore located adjacent the upper surface of the structure 20. The crack-termination region 27 extends in the z-direction for only part of the thickness in the z-direction of the structure 20, so is not centrally-located in the structure along the z-direction. In other examples the crack-termination region 27 may be centrally-located in the structure 20 along the z-direction, or may be disposed toward the lower surface of the structure 20, or may be adjacent the lower surface of the structure 20. It may generally be expected that the crack-termination region 27 has substantially the same location relative to the z dimension of the structure 20 as the crack-propagation region 26, although this need not be the case in all examples.

In the illustrated example the crack-termination region 27 is a cylindrical region arranged such that the long-axis of the cylinder is parallel to the thickness of the structure 20 (the z-direction). In other examples the crack-termination region 27 may have a different shape, such as a sphere. The crack-termination region 27 is configured to facilitate preventing the further propagation of cracks which propagate into the crack-termination region 27 from the crack-propagation region 26. The boundary between the crack-termination region 27 and adjacent regions of the structure 20 other than the crack-propagation region 26 may be reinforced in order to prevent the further propagation of cracks which propagate into the crack-termination region 27. For example, this boundary may be reinforced by providing longitudinal boundary reinforcing elements 28 which extend around the circumference of the crack-termination region 27 except where the crack-termination region is adjacent the crack-propagation region 26. The properties of the boundary reinforcing elements 28 may be substantially similar to the properties of the first, second and third reinforcing elements 13, 14, 18 described above.

The location of the crack-propagation region 26 and the crack-termination region 27 adjacent a surface of the structure 20 confers the advantage that cracks in either of these regions may be visible (e.g. to a human observer, or a camera-based monitoring device arranged to view the surface) from outside of the structure 20. A load-bearing structure according to the invention which has this arrangement may therefore facilitate monitoring the structural health of the structure. In some examples a transparent layer or coating may be provided on the upper surface of the structure 20, either across the entire surface or only on the parts comprised in the crack-propagation region 26 or the crack-termination region 27. Such a coating is configured to protect the underlying structure 20 whilst maintaining visibility of the damage state of the crack-propagation region 26 and the crack-termination region 27.

Figure 3A:
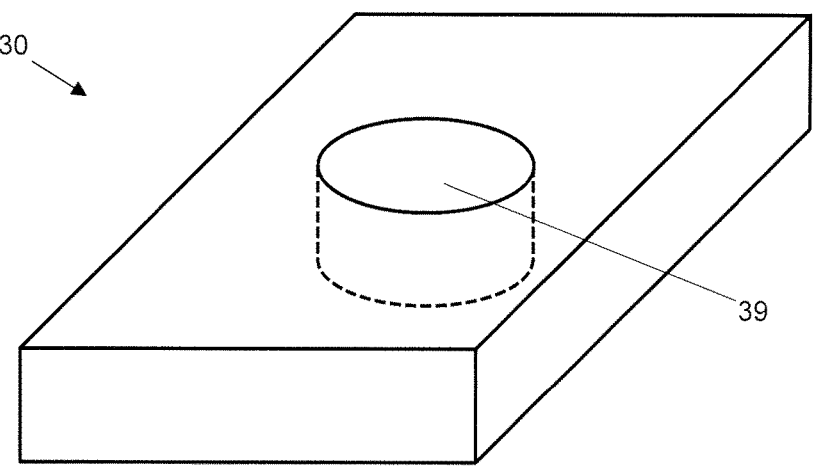
FIG. 3*a* is a schematic perspective view of a third example load-bearing structure according to the invention.
Figure 3B:
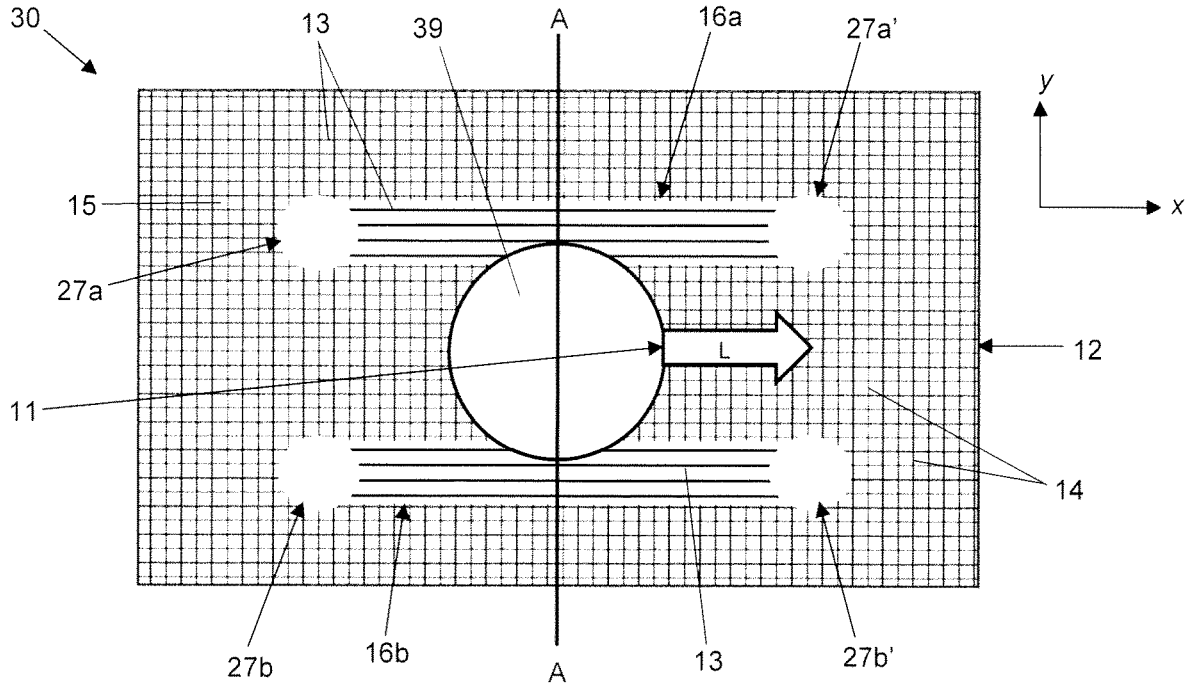
FIG. 3*b* is a schematic plan view of the example load-bearing structure of FIG. 3*a;*
Figure 3C:
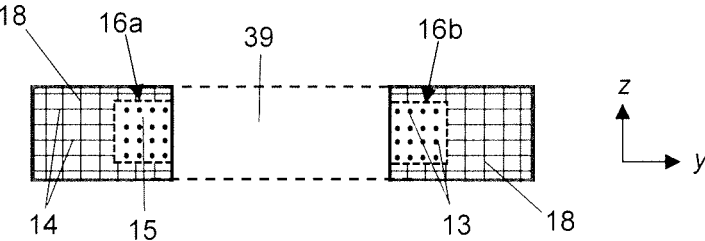
FIG. 3*c* is a cross-section through the example load-bearing structure of FIG. 3*a;*

FIGS. 3a-c show a further example load-bearing structure 30 according to the invention. The structure 30 is shown in perspective in FIG. 3a. A plan view of the structure 30 is provided in FIG. 3b, and FIG. 3c is a cross-section taken along the line A-A. Many features of the example structure 20 are substantially identical to the corresponding features of the example structure 10 of FIGS. 1a-c and/or the example structure 20 of FIGS. 2a-c. Like the version of the example structure 10 shown in FIG. 1c, the example structure 30 comprises third reinforcing elements 18 in addition to first and second reinforcing elements 13, 14. Features of the example structure 30 which are common with the example structure 10 and/or the example structure 20 have been given the same reference numbers and will not be further discussed.

The example structure 30 comprises an opening 39, and is configured to transfer load from an edge of the opening 39 (this edge forms the first part 11 of the structure 30) to an edge of the structure 30 (this edge forms the second part 12 of the structure 30). The opening 39 extends completely through the structure 30 (that is, the opening has the form of a through-hole). Other examples are possible in which the opening 39 does not extend completely through the component 30, but instead has the form of a recess. In the illustrated example the opening 39 is circular, although that need not be the case in other examples. The opening 39 is configured to engage with a further structure during operation of the load-bearing structure 30 such that load is transferred from the further structure to the load-bearing structure 30 via the opening 39. For example, the opening 39 may be configured to receive a pin, spigot, bearing, or the like, such that loads are transferred into the structure 30 from the pin, spigot, bearing or the like, via the opening 39. The structure 30 is configured to receive loads acting radially with respect to the axis of the opening 39.

The structure 30 comprises two crack-propagation regions 16a, 16b, each of which has a substantially similar configuration to the other, and to the example crack-propagation region 16 discussed above. Each of the crack-propagation regions 16a, 16b is adjacent the opening 39. The crack-propagation regions 16a, 16b are located such that the opening 39 is between the crack-propagation regions 16a, 16b.

The structure 30 further comprises four crack-termination regions 27a, 27a', 27b, 27b'. Each of the crack-termination regions 27a, 27a', 27b, 27b' is located adjacent a different end of a crack-propagation region 16a, 16b. The crack-termination regions 27a, 27a' are located adjacent opposite ends of the upper (with respect to the orientation shown in FIG. 3b) crack-propagation region 16a, and the crack-termination regions 27b, 27b' are located adjacent opposite ends of the lower crack-propagation region 16b. Each of the crack-termination regions 27a, 27a', 27b, 27b' has a substantially similar configuration to each other crack-termination region 27a, 27a', 27b, 27b' of the structure 30, and to the example crack-termination region 27 discussed above.

The crack-propagation regions 16a, 16b and the crack-termination regions 27a, 27a', 27b, 27b' are located centrally in the structure 30 with respect to the z dimension, and do not extend for the full thickness of the structure 30. The crack-propagation regions 16a, 16b include regions of the structure 30 where cracks might be expected to form, in particular the upper and lower edge regions of the opening 39. However; neither the crack-propagation regions 16a, 16b nor the crack-termination regions 27a, 27a', 27b, 27b' overlap with the main load path between the first part 11 and the second part 12 of the structure 30. This means that the structure 30 should still be able to operate to transfer load from the first part 11 to the second part 12 even when cracks are present in any or all of the crack-propagation and crack-termination regions.

Figure 4:
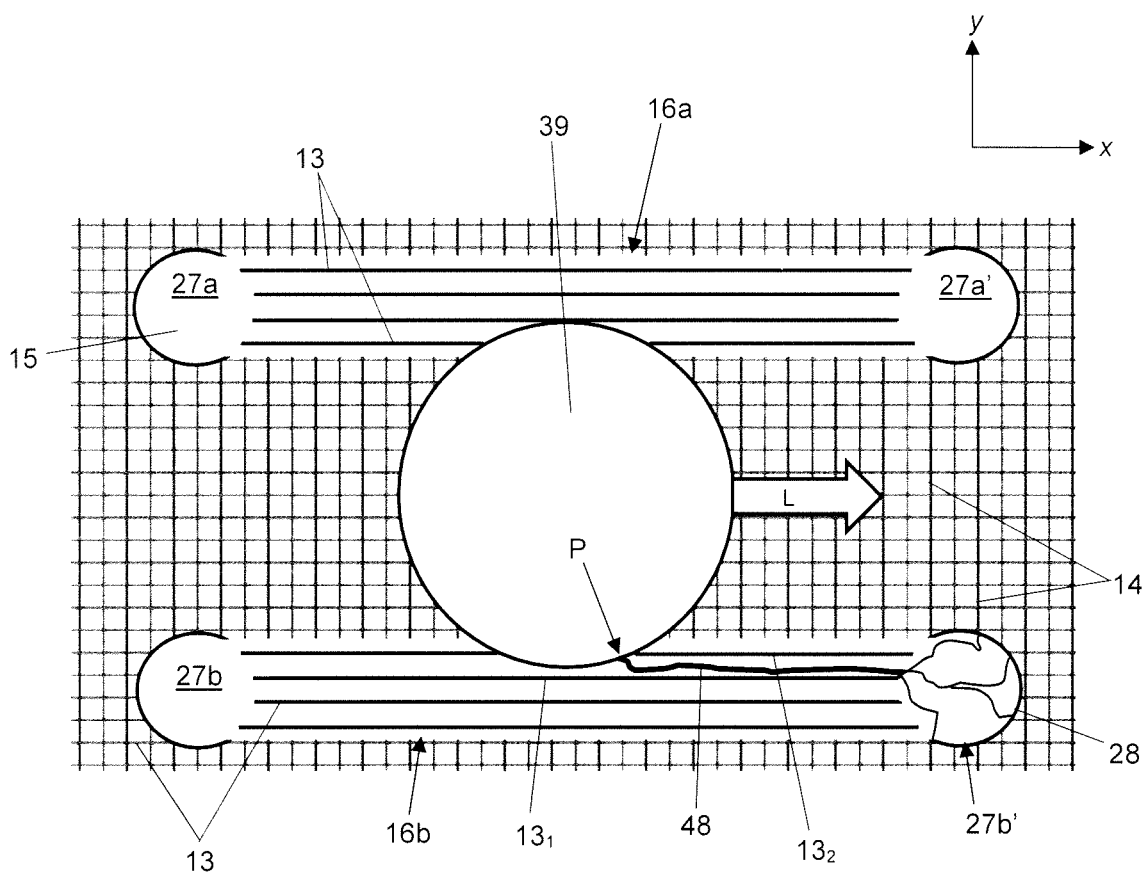
FIG. 4 is a schematic plan view of part of the example load-bearing structure of FIGS. 3*a-c* after a crack has developed.

The manner in which the crack-propagation (and, if present, crack-termination regions) of load-bearing structures according to the invention function to control the propagation of cracks will now be explained with reference to FIG. 4. FIG. 4 is a plan view of the part of the structure 30 which includes the opening 39 and the crack-propagation regions 16a, 16b and crack-termination regions 27a, 27a', 27b, 27b.

A crack 48 is present in the structure 30. It extends within the lower crack-propagation region 16b and the lower right-hand crack-termination region 27b'. The crack initiated at the point P on the edge of the opening 39, in the lower crack-propagation region 16b. The crack 48 initially propagated substantially radially away from the opening 39, until it encountered one of the first reinforcing elements 131. Further propagation of the crack 48 in the radial direction was prevented by the first reinforcing element 131. The crack 48 therefore continued to propagate substantially along the first direction x, guided between the first reinforcing element 131 and the adjacent first reinforcing element 132. It will be appreciated that the presence of the two first reinforcing elements 131, 132 constrains the propagation path of the crack 48.

The first reinforcing elements 131, 132 end at the boundary between the crack-propagation region 16b and the crack-termination region 27b'. When the crack 48 reached this point, its path was therefore no longer constrained. In the illustrated example, upon reaching the crack-termination region 27b' the crack 48 divided into several smaller sub-cracks which propagated throughout the crack-termination region 27b'. Each sub-crack ceased propagating upon encountering a boundary reinforcing element 28 at the boundary of the crack-termination region 27b'.

The shape and size of the crack-propagation region(s) and, if present, the crack-termination region(s) of an example load-bearing structure according to the invention are selected according to the particular intended application of that structure, to ensure that the energy which is causing the cracking will have been dissipated by the time the crack reaches the distal edge of a crack-propagation region, or if present, a crack-termination region. In examples in which the structure does not include any crack-termination regions, a given crack-propagation region may need to be longer in the first direction x than if an adjacent crack-termination region were present.

The crack-propagation regions (and, if present, crack-termination regions) of load-bearing structures according to the invention thereby function to guide cracks which form in the structure along selected pathways, which may be away from a main load path through the structure. This makes crack propagation in structures according to the invention highly predictable, and ensures that the structure will still be able to operate to transfer loads even after a crack has formed. These beneficial effects of structures according to the invention, combined with the inherent benefits of metal matrix composite materials, make such structures especially suitable for aerospace applications.

Figure 5:
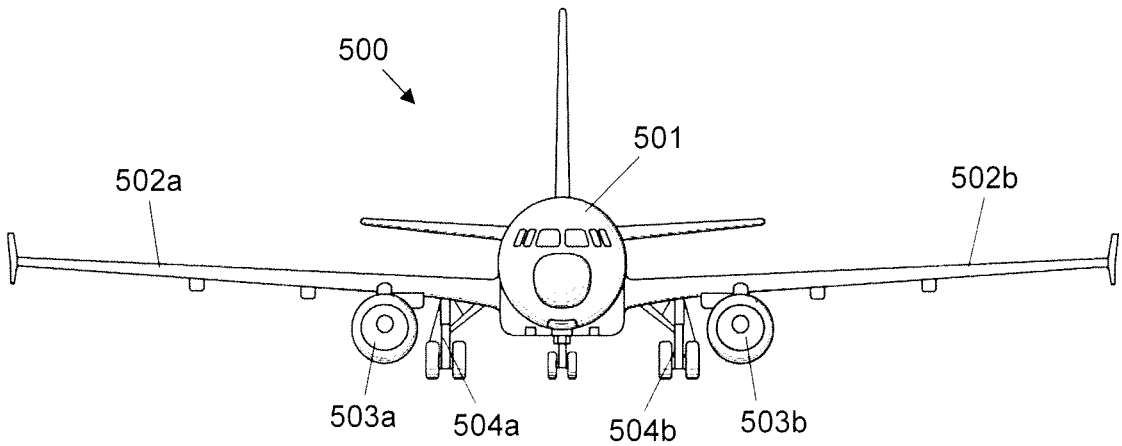
FIG. 5 is a front view of an example aircraft comprising a load-bearing structure according to the invention.

FIG. 5 shows an example aircraft 500 comprising one or more load-bearing structures according to the invention. The aircraft 500 has a fuselage 501 to which a pair of wings 502a, 502b is mounted. An engine 503a, 503b and a main landing gear 504a, 504b is mounted to each of the wings. In particular, each wing 502a, 502b comprises a gear rib, to which the respective main landing gear is attached. The gear ribs are load-transferring components, and may each comprise a load-bearing structure according to the invention. One or more components of the engine mounting mechanism by which each engine 503a, 503b is mounted to the corresponding wing 502a, 502b may also comprise load-bearing structures according to the invention. In general, any load-bearing structure of the aircraft 500 which is configured to transfer a load from a first part of the structure to a second part of the structure may advantageously be a load-bearing structure according to the invention.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. A load-bearing structure configured to, during operation of the structure, transfer load from a first part of the structure to a second part of the structure via a load path, the component comprising:

a matrix material;

a plurality of longitudinal first reinforcing elements embedded in the matrix material, wherein the long axis of each first reinforcing element is substantially aligned with a first direction; and a plurality of longitudinal second reinforcing elements embedded in the matrix material, wherein the long axis of each second reinforcing element is substantially aligned with a second direction, the second direction being substantially perpendicular to the first direction;

wherein the structure has a predefined crack-propagation region configured to control the propagation of a crack in the structure, and wherein the crack-propagation region comprises multiple first reinforcing elements and does not comprise any second reinforcing elements or comprises multiple second reinforcing elements and does not comprise any first reinforcing elements, and wherein a region comprising the first reinforcing elements is embedded within a region comprising the second reinforcing elements.

2. A load-bearing structure according to claim 1, further comprising a plurality of longitudinal third reinforcing elements embedded in the matrix material, wherein the long axis of each third reinforcing element is substantially aligned with a third direction, the third direction being substantially perpendicular to the first direction and substantially perpendicular to the second direction.

3. A load-bearing structure according to claim 1, wherein the load path is substantially within a plane defined by the first direction and the second direction.

4. A load-bearing structure according to claim 1, wherein the load path is substantially parallel to the first direction, and wherein the crack-propagation region comprises multiple first reinforcing elements and does not comprise any second reinforcing elements.

5. A load-bearing structure according to claim 1, wherein a length of each second reinforcing element is at least 50% of a dimension of the structure along the second direction.

6. A load-bearing structure according to claim 1, wherein the crack-propagation region is longitudinal and has a long axis parallel to the first direction.

7. A load-bearing structure according to claim 1, wherein the location of the crack-propagation region is selected such that the presence of cracks in the crack-propagation region does not prevent operation of the structure to transfer load from the first part to the second part.

8. A load-bearing structure according to claim 1, further comprising a predefined crack-termination region of the structure which does not contain any reinforcing elements, wherein the crack-termination region is adjacent to the crack-propagation region and is configured to limit the propagation of a crack in the structure.

9. A load-bearing structure according to claim 8, wherein a region of the load-bearing structure disposed between the crack-termination region and a surface of the structure is transparent.

10. A load-bearing structure according to claim 1, further comprising an opening which extends through the structure, wherein the structure is configured to transfer load from the opening to the second part of the structure via the load path, and wherein the crack-propagation region is adjacent the opening.

11. A load-bearing structure according to claim 10, wherein the opening is configured to engage with a further structure during operation of the structure such that load is transferred from the further structure to the structure via the opening.

12. A load-bearing structure according to claim 1, wherein the crack-propagation region is an internal region of the load-bearing structure, such that the crack-propagation region does not comprise any part of any surface of the load-bearing structure.

13. A load-bearing structure according to claim 1, wherein the crack-propagation region comprises a part of at least one surface of the load-bearing structure.

14. A load-bearing structure according to claim 1, wherein a transparent layer is provided on a part of a surface of the load-bearing structure which is comprised in the crack-propagation region.

15. A load-bearing structure according to claim 1, wherein each first reinforcing element and each second reinforcing element comprises a continuous element.

16. A load-bearing structure according to claim 1, wherein each first reinforcing element and each second reinforcing element comprises one of: an aluminium oxide fibre, a carbon fibre; a silicon carbide fibre.

17. A load-bearing structure according to claim 1, wherein the structure is an aircraft structure.

18. An aircraft comprising a load-bearing structure according to claim 1.

* * * * *